United States Patent [19]
Davis et al.

[11] Patent Number: 5,332,070
[45] Date of Patent: Jul. 26, 1994

[54] THREE PARAMETER VISCOUS DAMPER AND ISOLATOR

[75] Inventors: Lawrence P. Davis, Phoenix; David C. Cunningham, Carefree; Damon H. Duncan, Phoenix, all of Ariz.

[73] Assignee: Honeywell Inc., Minneapolis, Minn.

[21] Appl. No.: 51,110

[22] Filed: Apr. 21, 1993

[51] Int. Cl.$^5$ .............................................. F16F 5/00
[52] U.S. Cl. .................................. 188/298; 188/280; 188/297; 267/122
[58] Field of Search ...................... 188/297, 298, 280; 267/64.27, 64.23, 64.19, 122, 123

[56] References Cited

U.S. PATENT DOCUMENTS

| | | | |
|---|---|---|---|
| 2,930,455 | 3/1960 | Williams | 188/298 |
| 2,936,860 | 5/1960 | Peras | 188/94 |
| 3,107,752 | 10/1963 | McLean | 188/87 |
| 3,266,603 | 8/1966 | Kamimoto | 188/100 |
| 3,980,358 | 9/1976 | Davis | 308/173 |
| 4,241,816 | 12/1980 | Hubrecht et al. | 188/298 |
| 4,760,996 | 8/1988 | Davis | 188/298 |
| 4,768,627 | 9/1988 | Taylor | 188/280 |
| 5,180,145 | 1/1993 | Watanabe et al. | 188/298 |

FOREIGN PATENT DOCUMENTS

| | | | |
|---|---|---|---|
| 0414508 | 2/1991 | European Pat. Off. | 188/298 |
| 63-219929 | 9/1988 | Japan . | |
| 0588420 | 2/1978 | U.S.S.R. | 188/298 |
| 1421959 | 9/1988 | U.S.S.R. | 188/298 |

OTHER PUBLICATIONS

F. S. Tse, et al., Case 6. Elastically Supported Damped Systems, from Mechanical Vibrations Theory and Applications, Second Edition, 1978, pp. 106-107.

J. C. Snowdon, 1968, pp. 33-38, Damping of a Three Element Spring and Dashpot Combination from the book Vibration and Shock in Damped Mechanical Systems.

Wilson, et al., Viscous Damped Space Structure for Reduced Jitter, 58th Shock and Vibration Symposium, Aug. 1987.

Davis, et al., An Advanced D-Strut TM, Damping '91 Conference San Diego, California.

Davis, et al., Work on Structural Dynamics & Control Interaction of Flexible Structures. NASA, Mar. 1989.

Anderson, et al., Testing & Application of a Viscous Passive Damper for use in Precision Truss Structures, American Institute of Aeronautics and Astronautics, Inc. 1991.

Davis, et al., New Structure Design Criteria Offer Improved Pointing and Lower Weight, 59th Shock & Vibration Symposium Albuquerque, N.M., Oct. 1988.

Wilson, et al., Very High Damping in Large Space Sturctures, ASME Vibrations Conference, Boston Mass.

Cunningham, et al., A Multi-Axis Isolation System for the French Earth Observation Satellite's Magnetic Bearing Reaction Wheel, Proceedings of the ADPA AIAA ASME SPIE Conference on Active Materials in Adaptive Structures, Nov. 5-7, 1991.

*Primary Examiner*—Matthew C. Graham
*Attorney, Agent, or Firm*—Thomas A. Rendos

[57] ABSTRACT

A vibration isolation apparatus having a shaft with an axis therethrough. The shaft has a first and second end. A piston having an axial bore is coaxially positioned with the shaft to provide a damper by forming a damping path between the piston and the shaft. A flange extends radially from the piston for coupling the apparatus to a load. A first extension is coupled to and extends radially from the first end of the shaft and a second extension is coupled to and extends radially from the second end of the shaft. Secondary bellows extending from and secondary fluid paths extending through the first and second extensions provide a first volumetric stiffness in series with the damper. Primary bellows connect the flange to the first and second extensions and are coaxial with the shaft to provide a second volumetric stiffness parallel with the damper and the first volumetric stiffness.

23 Claims, 4 Drawing Sheets

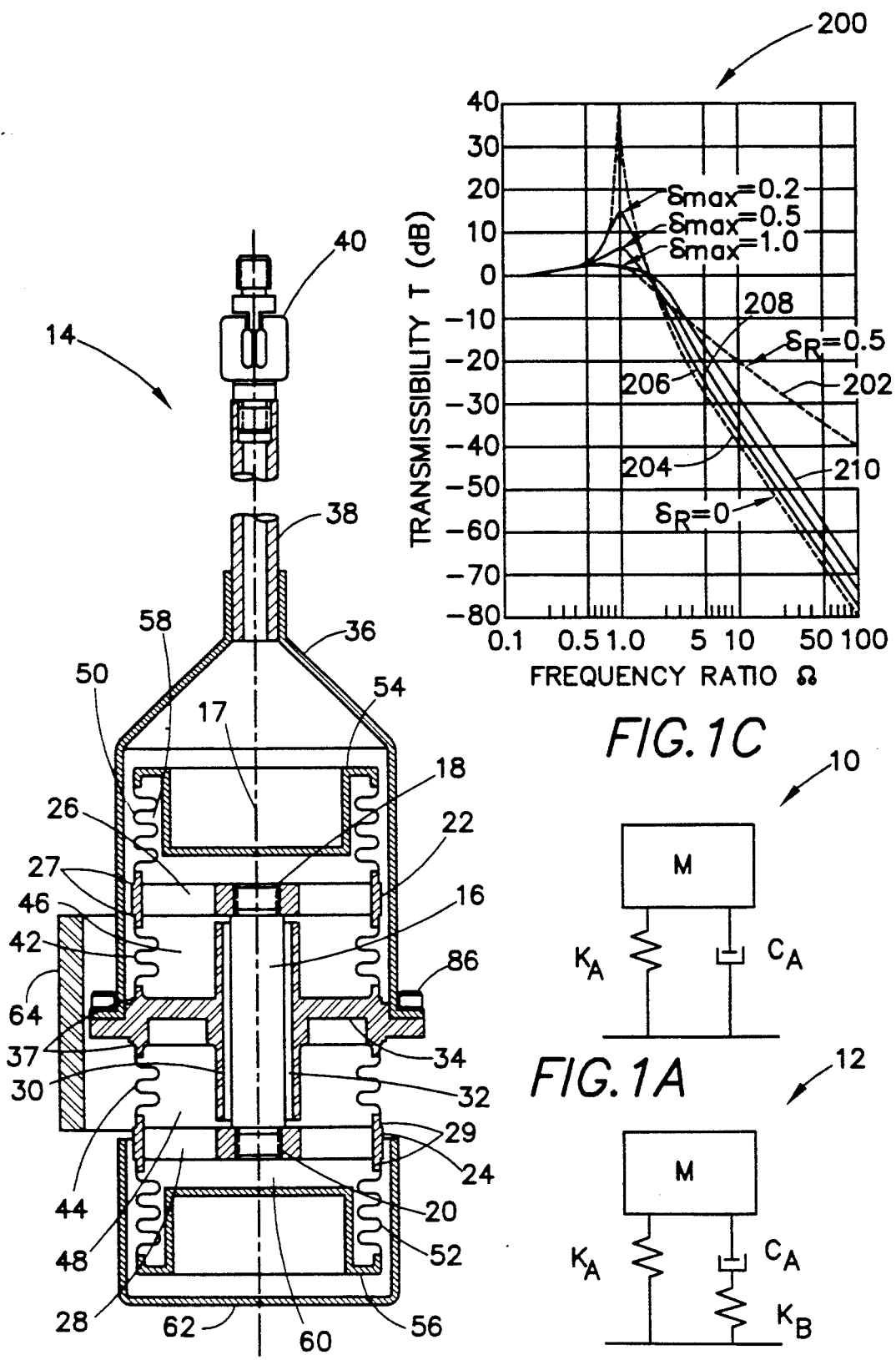

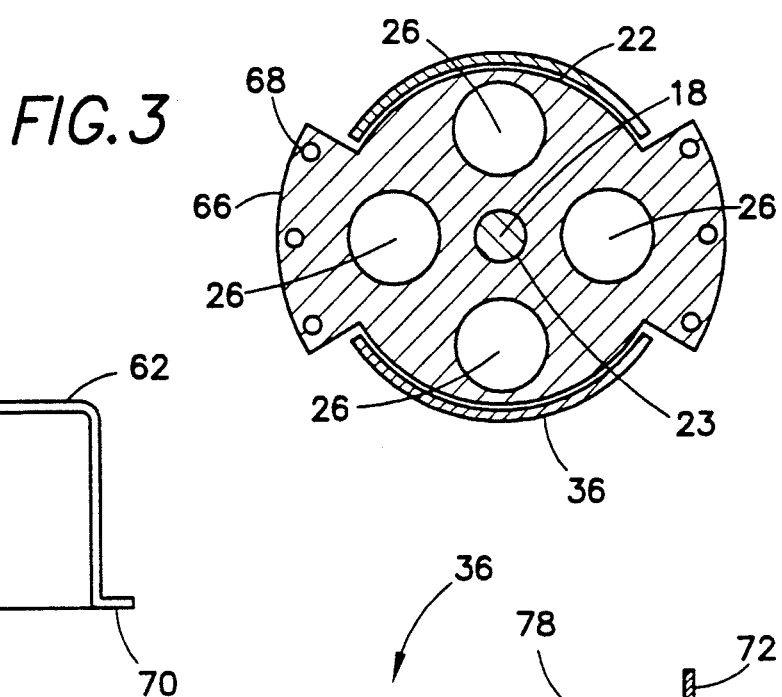
FIG. 3
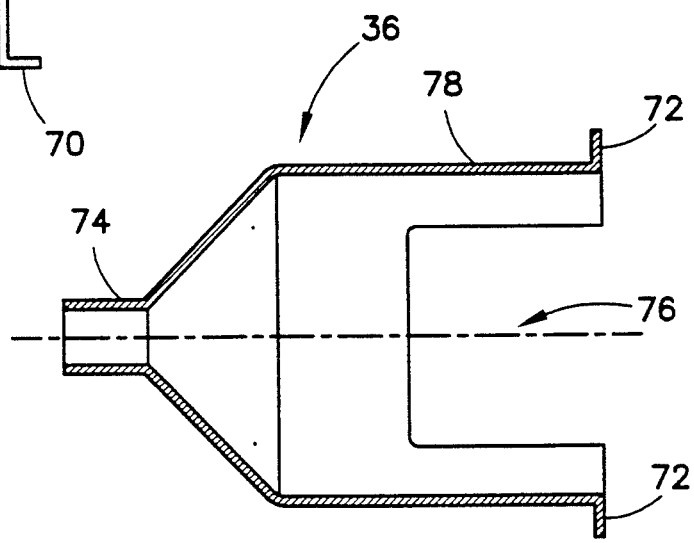
FIG. 5A
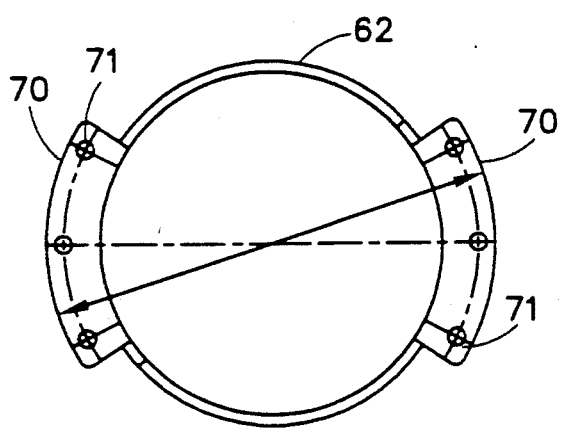
FIG. 4A
FIG. 4B
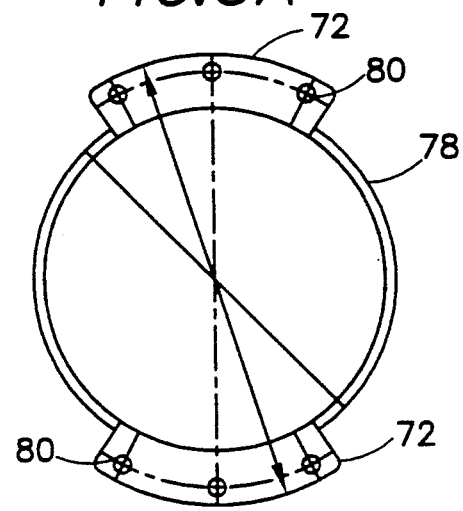
FIG. 5B

THREE PARAMETER VISCOUS DAMPER AND ISOLATOR

FIELD OF THE INVENTION

The present invention relates to the field of vibration damping and isolation. More particularly, the present invention pertains to a three parameter viscous damper and isolation system.

BACKGROUND OF THE INVENTION

Precision structural systems carrying a load, such as a telescopic system, are susceptible to disturbances that can produce structural vibrations. Such vibrations may be contributed to the system by components or assemblies of the precision structural systems itself, for example, reaction wheel assemblies of the telescopic system. Since such precision structures tend to have little inherent damping, these vibrations can lead to serious performance degradation. Therefore, an efficient means of damping and isolating the load carried by the precision structures in a controlled manner is of considerable importance.

Both active and passive damping and isolation techniques have been utilized. However, active systems suffer from high cost, low reliability and poor low level threshold performance. On the other hand, passive systems require no power, are often less expensive than active devices and do not drive the structure unstable. Thus, passive damping systems have proven to play a significant role in the overall design of precision structural systems. One such manner of implementing a passive system includes the use of viscous damping and isolation. Viscous dampers and isolators include a fluid reservoir sealed in a damping structure which utilizes viscous fluid shear forces to provide damping and isolation.

One type of viscous damper and isolator, a conventional two parameter system 10, is shown in the mechanical schematic of FIG. 1A. The system includes a damper with a damping function $C_A$ which could be implemented with a piston moving through a liquid in a cylinder. As the piston moves, the damping function is controlled by the size of an orifice allowing liquid to pass from one side of the piston to the other side of the piston. The orifice may be the clearance between the piston and the cylinder. The schematic two parameter system 10 also includes a spring $K_A$, representing a spring constant. This spring $K_A$ is parallel with the damper $C_A$ and a mass M is attached and applied thereto.

An implemented two parameter system is shown and described in U.S. Pat. No. 4,760,996 to Davis, entitled "Damper and Isolator" and in U.S. Pat. No. 3,980,358 to Davis, issued Sep. 14, 1976 and entitled "Axial Vibration Damper for Floating Bearings". An additional two-parameter system is described in the paper entitled, "A MultiAxis Isolation System for the French Earth Observation Satellite's Magnetic Bearing Reaction Wheel," by D. Cunningham, P. Davis and F. Schmitt, Proceedings of the ADPA/AIAA/ASME/SPIE Conference on Active Materials and Adaptive Structures, Nov. 5-7, 1991. The paper describes a six degree of freedom isolation system using viscous dampers.

A mechanical schematic of an additional damper and isolator is shown by the three parameter system 12 of FIG. 1B. The three parameter system 12, includes a spring $K_B$, representative of a spring constant, in series with a damper $C_A$ representative of a damping function. The three parameter system further includes a spring $K_A$ representative of a spring constant, parallel to the damper $C_A$ and spring $K_B$. A mass M or load is applied to the system. Such a mechanical schematic is discussed in the textbook entitled "Mechanical Vibrations *Theory and Applications*, F. S. Tse, I. E. Morse, R. T. Hinkle, Second Edition 1978, pages 106-107.

It can be said that a two parameter system is simply a special case of a more general three parameter system; that is, when $K_B$ is equal to infinity. Most practical isolation systems have a finite value of $K_B$ due to some compressibility of the fluid or volumetric compliance in the housing of a particular viscous isolator. Nevertheless, they essentially act as a two parameter system because of the relatively large value of $K_B$ compared to $K_A$; $K_A$ being the stiffness in parallel with the damper $C_A$.

One of the prime concerns in the field of vibration isolation is the proper use of isolators to isolate loads from external vibrations under various load configurations with respect to a desired natural frequency. The natural frequency is the frequency at which a freely vibrating mass system oscillates once it has been deflected. In the case where external vibrations occur over a wide frequency range, resonance is said to exist when the natural frequency of the viscous isolator coincides with the frequency of the external vibration or excitation forces. Resonance causes magnification of the external vibration and may be harmful to the isolated structure if not controlled within reasonable limits.

Two parameter systems lack adequate performance when isolation at frequencies substantially above resonance is important, and/or when reduced amplification at resonance is important as is shown by the transmissibility plot 200 of FIG. 1C. The transmissibility plot 200 shows two dashed curves 204 and 202 representing two parameter systems of transmissibility versus frequency ratio, i.e., frequency of external vibrations to a natural frequency. Dashed line 202 represents a 50% damped system and shows that isolation at high frequencies is extremely poor. Dashed line 204 represents a 0% damped system and although isolation is much better at high frequencies, amplification at resonance is unacceptable. The three solid curves 206, 208 and 210 represent transmissibility versus frequency ratio for a three parameter system. As is shown, with a 100% damped system at resonance, the amplification at resonance is approximately a factor of 4. The same as for a two parameter 50% damped system. As shown by solid line curves 206 and 208, although isolation at high frequency is improved with a lesser damped three parameter system, i.e., curve 206 a 20% damped system and curve 208 a 50% damped system, amplification at resonance also increases. This indicates that a fundamental rule generally exists when optimizing a three parameter system; the rule being that the frequency at which maximum damping occurs should be equal to the resonance frequency. However, other basis of optimization may be more appropriate depending on the application. As is shown in FIG. 1C, a three parameter system has the primary advantage over the two parameter system in that three parameter system provides better isolation at high frequencies with equal or less amplification at the resonance frequency.

Although prior modeling of two and three parameter systems indicates that a three parameter system provides better isolation at high frequencies with equal or less amplification at the resonance frequency, an efficient three parameter viscous isolator providing such isolation is not known. Therefore, a need for such a three parameter viscous isolation system exists.

SUMMARY OF THE INVENTION

A vibration damping and isolation apparatus implementing a three parameter system to provide improved isolation at high frequencies with equal or less amplification at the resonance frequency than a two parameter system is described in accordance with the present invention. The vibration isolation apparatus includes a shaft having an axis therethrough. The shaft has a first and second end. A piston having an axial bore is coaxially positioned with said shaft to provide a damper by forming a damping path therebetween. The piston has a flange extending radially therefrom for coupling the apparatus to a load. A first extension is coupled to and extends radially from the first end of the shaft and a second extension is coupled to and extends radially from the second end of the shaft. Secondary isolation means extends from and through the first and second extensions for providing a first volumetric stiffness in series with the damper. Primary isolation means connects the flange to the first extension and second extension and is coaxial with the shaft for providing a second volumetric stiffness parallel with the damper and the secondary isolation means.

In one embodiment of the invention, the first volumetric stiffness is less than about fifty times the second volumetric stiffness. Preferably, the first volumetric stiffness is at least equal to the second volumetric stiffness but no greater than about ten times the second volumetric stiffness.

In another embodiment of the invention, the primary isolation means includes a first primary bellows connected between the first extension and the flange for forming a first fluid chamber and a second primary bellows connected between the second extension and the flange for forming a second fluid chamber. The first fluid chamber is connected to the second fluid chamber by the damping path. The second isolation means includes a first fluid path through the first extension and a second fluid path through the second extension. The second isolation means further includes first secondary bellows connected to the first extension and a first sealing member to form a third fluid chamber. The third fluid chamber is connected to the first fluid chamber by the first fluid path. In addition, a second secondary bellows is connected to the second extension and a second sealing member to form a fourth fluid chamber. The fourth fluid chamber is connected to the second fluid chamber by the second fluid path.

In additional embodiments of the invention, the damping path has a greater resistance to flow than the first and second fluid paths. Also, the vibration isolation apparatus includes means for protecting the apparatus against overload.

BRIEF DESCRIPTION OF THE DRAWINGS

FIG. 1A and FIG. 1B are mechanical schematics of a two and three parameter isolation system, respectively, and FIG. 1C is a transmissibility comparison of the systems.

FIG. 2 is a crosssectional view of a viscous isolator in accordance with the present invention taken at Line A—A of the viscous isolator of FIG. 7.

FIG. 3 is a cross-sectional view of the viscous isolator of FIG. 2 taken at Line B—B of the viscous isolator of FIG. 7.

FIG. 4A and FIG. 4B are a plan view and an end view, respectively, of a shield of the viscous isolator of FIG. 2.

FIG. 5A and FIG. 5B are a cross-sectional view taken at Line A—A of FIG. 7 and an end view, respectively, of a cover of the isolator of FIG. 2.

DESCRIPTION OF THE PREFERRED EMBODIMENT

Figure 6:
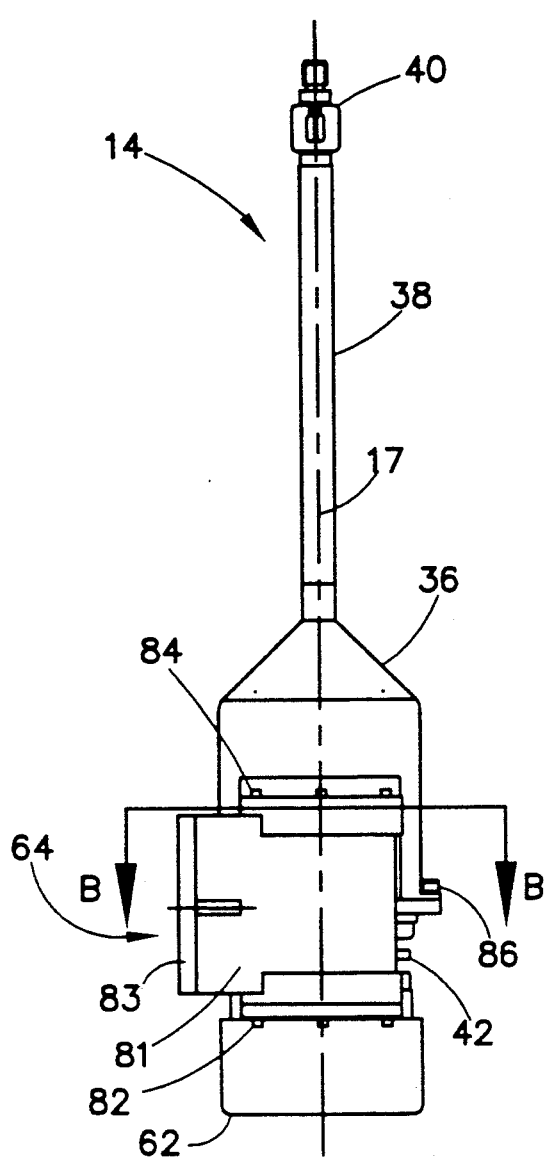
FIG. 6 is a side view of the viscous isolator in accordance with the present invention.
Figure 7:
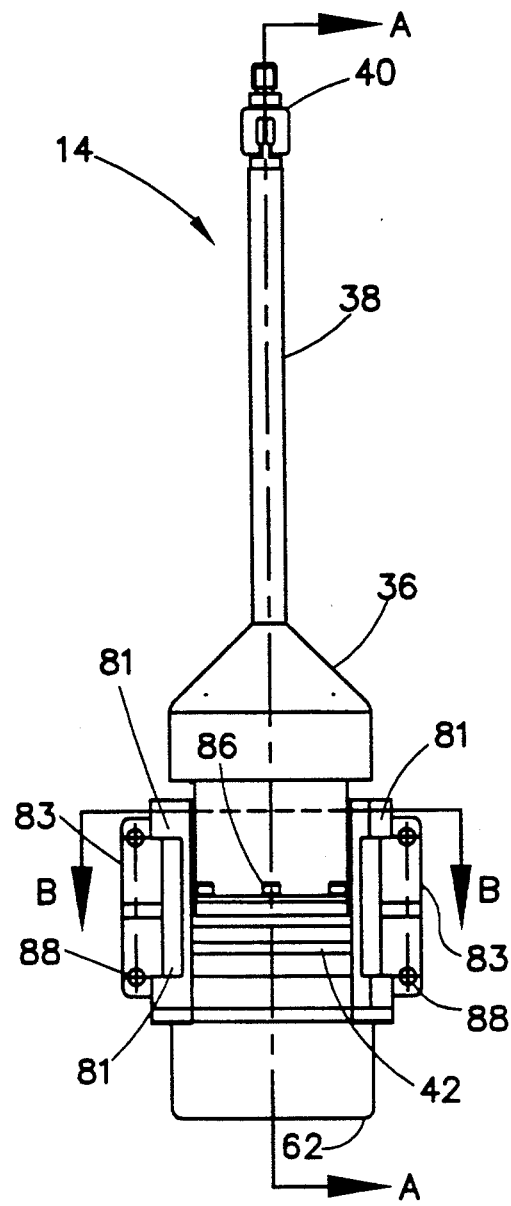
FIG. 7 is a top view of the isolator as shown in FIG. 6.
Figure 8:
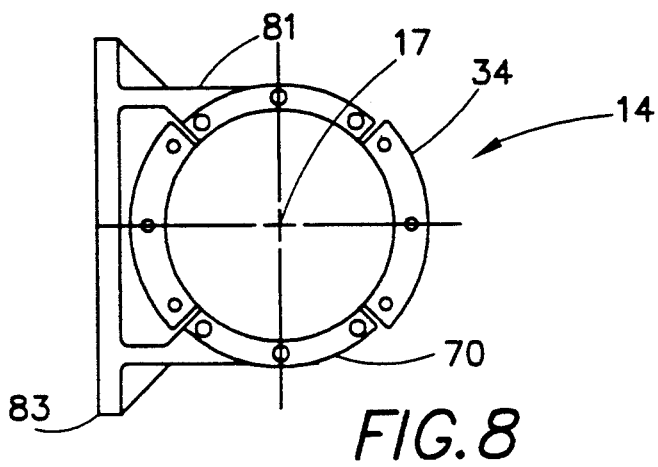
FIG. 8 is an end view of the isolator shown in FIG. 6.

As described with regard to the mechanical schematic two parameter and three parameter vibration isolation systems shown in FIG. 1A and FIG. 1B of the Background of the Invention section herein, the three parameter system provides better isolation at high frequencies with equal or less amplification at resonance frequency than does a two parameter system. For example, with reference to the comparison transmissibility plot of FIG. 1C, a two parameter system having 50% damping function has amplification at resonance of approximately 4-to-1 and attenuation at 100 Hertz of approximately −40 db. In comparison, amplification at resonance for a three parameter system having a damping function at its maximum, may also be about 4-to-1; however, the attenuation at 100 Hertz is about −68 db. The spring $K_B$, in series with the damper $C_A$, is the difference between the two and three parameter systems. Although as previously indicated, the two parameter system is simply a special case of the general three parameter system, i.e., when $K_B$ is equal to infinity, most isolation systems have a finite value of $K_B$ due to some compressibility of the fluid or volumetric compliance in the housing. Nevertheless, the isolation systems act essentially as two parameter systems because of the relatively large value of $K_B$ compared to $K_A$; $K_A$ being the stiffness that is in parallel with the damper and spring $K_B$.

A three parameter viscous isolator, utilizing an incompressible fluid such as silicone, in accordance with the present invention, provides a low value of $K_B$ as compared to $K_A$ in order to achieve a viscous isolator 14 which functions as a three parameter system rather than a two parameter system. Typical optimum values of $K_B$ range from $K_A$ to about ten times $K_A$; the values being a function of the frequency at which maximum damping is desired. When $K_B$ has a value of greater than about fifty $K_A$, the three parameter system essentially functions for most applications as a two parameter system.

The viscous isolator 14 in accordance with the present invention, i.e., functioning as a three parameter system, shall be described with reference to FIGS. 2-8. The viscous isolator 14 includes a shaft 16 having an axis 17 therethrough. The shaft 16 includes a first shaft end 18 and a second shaft end 20. Secured to shaft end 18 is a first extension 22 and secured to shaft end 20 is a second extension 24.

As best shown in FIG. 3, first extension 22 which is substantially the same as second extension 24, includes a plurality of secondary fluid paths 26 which extend through the extension 22. The first extension 22 also includes an opening 23 coaxial with axis 17 and sized to tightly secure shaft end 18 therein. In addition, the first extension includes a flange 66 for connection via hardware 68 to a base 64; such connection further described below.

Positioned coaxial with the shaft 16 is piston 30. Piston 30 has an axial bore therethrough of a diameter greater than the diameter of the shaft 16 to form a primary damping annulus 32 therebetween. A flange 34 is integral with and extends radially from a midsection of piston 30. The flange 34 couples a load to the viscous isolator 14 via pivot flexure 40, tube 38 coupled to pivot flexure 40, and cover 36 coupled to tube 38 and to flange 34 via hardware 86. The cover 36 is shown in more detail in FIG. 5A and FIG. 5B. Cover 36 includes a main portion 78 for covering a portion of the viscous isolator 14, a tube mating portion 74 for coupling the cover to tube 38, a couple of voids 76 for allowing the flange 66 of extension 22 to connect to base 64, and a lip 72 for connection to the flange 34 0 through holes 80 via appropriate hardware 86. The cover is constructed of a suitable aluminum alloy.

The flange 34 includes mating portions 37 for attaching a first primary bellows 42 and a second primary bellows 44 to a mating portion 27 of first extension 22 and a mating portion 29 of second extension 24, respectively. The mating portions 27, 29, 37 allow for attachment of the ends of the primary bellows 42, 44 thereto by an adequate sealing epoxy. The bellows described herein are constructed of nickel, a copper laminate, or any other suitable material and are available from Servometer Corporation, Cedar Grove, N.J., or MS BELOWS, Huntington Beach, Calif.

The first primary bellows 42 has a first end connected to mating portion 37 of flange 34 and a second end connected to mating portion 27 of first extension 22 to form a first primary fluid chamber 46. The second primary bellows 44 has a first end connected to a mating portion 37 of flange 34 and a second end connected to a mating portion 29 of second extension 24 to form a second primary fluid chamber 48. The first and second primary fluid chambers 46, 48 are connected via the fluid path of the primary damping annulus 32. The first and second primary bellows 42, 44 substantially provide the stiffness $K_A$ as shown in the mechanical schematic of the three parameter system 12 of FIG. 1B. The damper $C_A$ as shown in the three parameter system 12 of FIG. 1B is substantially provided by the shear forces of the incompressible fluid through the primary damping annulus 32.

To complete the mechanical schematic of the three parameter system 12, as shown in FIG. 1B, the viscous isolator 14 includes an additional pair of bellows, first secondary bellows 50 and second secondary bellows 52. To provide spring $K_B$ thereof first secondary bellows 50 is attached to a mating portion 27 of first extension 22 and to a first secondary sealing member 54 forming a first secondary fluid chamber 58. The first secondary fluid chamber 58 is coupled to first primary fluid chamber 46 by the secondary fluid path 26 which extends through the first extension 22, FIG. 3. Likewise, the second secondary bellows 52 has a first end which is connected to a mating portion 29 of second extension 24 and a second secondary sealing member 56 to form a second secondary fluid chamber 60. The second secondary fluid chamber 60 is coupled to the second primary fluid chamber 48 via the secondary fluid path 28 through the second extension 24.

Figure 10:
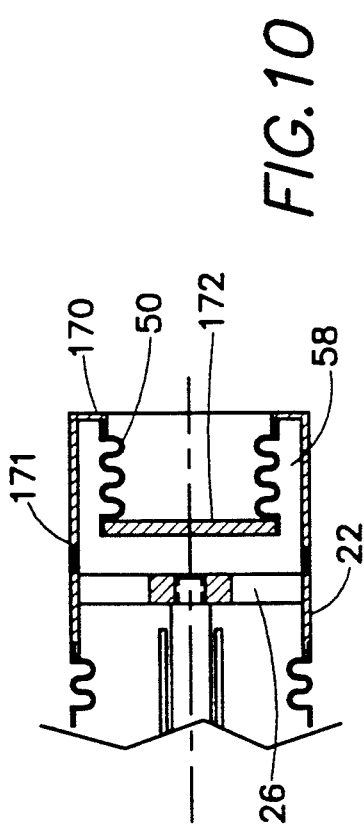
FIG. 10 is a cross-sectional view of an alternative embodiment for forming the secondary fluid chambers of a viscous isolator in accordance with the present invention.

In the preferred embodiment, as shown in FIG. 2, the secondary bellows 50 are connected to a lip of the secondary sealing member 54 and the extension 22 to form the secondary fluid chamber between the inside of the bellows and a cylindrical body portion of the sealing member 54. Likewise, each of the secondary bellows may be connected in a compressive configuration as shown in FIG. 10. The secondary bellows 50 are connected to a lip 170 extending from a cylindrical body portion 171 connected to the extension 22 and a seal plate 172 forming the secondary fluid chamber 58 between the outside of the bellows and the cylindrical body portion 171.

The viscous isolator 14 is further provided with a base 64 for coupling the viscous isolator 14 to ground or an additional load. The base 64, best shown in FIGS. 6-8, includes a lower base portion 83 for attachment of the base to ground or a load via hardware 88. An upper base portion 81 integral and transverse to the lower base portion 83 connects flange 66 of extension 22 via hardware 84 to ground or load. Likewise, a flange of second extension 24 is connected to upper base portion 81 via hardware 82. In addition, a shield 62, shown in further detail in FIGS. 4A and 4B is attached also by hardware 82 to the upper base portion 81 of base 64 for bellows protection. The shield 62 is formed from a suitable aluminum alloy and includes a lip 70 having holes 71 therein for such connection.

As described with reference to FIGS. 2-8, the viscous isolator 14 is a three parameter hermetically sealed isolator. The viscous isolator 14 has no sliding or rubbing elements that might wear or cause Coulomb friction or stiction. The primary damping annulus 32 is continually maintained by positioning piston 30 a predetermined distance from shaft 16 and maintaining that distance through the connections of the shaft ends 18, 20 to the first and second extensions 22, 24, respectively, and connection of the flange 34 via the primary bellows 42, 44 to the first and second extensions 22, 24, respectively. The stiffness of the primary bellows 42, 44 prevent such Coulomb friction or stiction.

The essential functions of the three parameter viscous isolator 14 are provided by the first and second primary bellows 42, 44; the first and second secondary bellows 50, 52; the first and second sealing members 54, 56; the piston 30; the shaft 16; the primary damping annulus 32; the plurality of secondary fluid paths 26; and the incompressible fluid contained within the viscous isolator 14, all of which components are axially symmetric about axis 17. When a force is applied to the viscous isolator 14, motion takes place between the shaft 16 and the piston 30 causing fluid to flow from one of the primary fluid chambers 46, 48 to the other fluid chamber via the damping annulus 32. Fluid shear takes place in the primary damping annulus 32 providing system damping. Some fluid will also flow from the first and second primary fluid chambers 46, 48 through the first and second secondary fluid paths 26, 28 to the first and second secondary fluid chambers 58, 60. The resistance to flow through the secondary fluid paths 26, 28 is made small as compared to the primary damping annulus 32 to minimize damping by such secondary fluid paths 26, 28. For example, in the preferred embodiment the cross sectional area of the plurality of secondary fluid paths of one of the extensions 22, 24 is approximately 32 times as large as the cross sectional area of the damping annulus 32.

The first and second secondary bellows 50, 52 and the associated first and second secondary fluid paths 26, 28, respectively, substantially reduce the volumetric stiffness $K_B$, FIG. 1B, of the viscous isolator 14. $K_B$ becomes essentially the axial stiffness of the secondary bellows. With the addition of the first and second secondary bellows 50 and 52, the designer of the viscous isolator gains the freedom to select a $K_B$ over a very large range by simply changing the design of the first and second secondary bellows 50,52. As previously indicated, the design of the secondary bellows is selected such that the volumetric stiffness $K_B$ is less than fifty times the volumetric stiffness $K_A$ in order to prevent the viscous isolator from functioning essentially as a two parameter system. Typically, the first and second secondary bellows 50, 52 are selected such that the volumetric stiffness $K_B$ is in the range of from $K_A$ to ten times $K_A$.

There are several ways for changing the design of the secondary bellows to meet such ratio requirements between the volumetric stiffness of $K_A$ and $K_B$; such designs not being limited to those listed below. Two particular methods are to change either the wall thickness of the bellows or the number of convolutions of the bellows. For example, in FIG. 2, the viscous isolator 14 includes primary bellows having two convolutions and the secondary bellows 50, 52 having three convolutions. Likewise, in a preferred embodiment, the wall thickness of the primary bellows 42, 44 is about 0.00224 inches and the wall thickness of the secondary bellows 50,52 is about 0.00276. As will be recognized by one skilled in the art, such values change depending upon the design.

One fundamental rule that is generally effective when optimizing a viscous isolator design is to set the frequency at which maximum damping occurs to be equal to the resonance frequency. However, other bases of optimization may be more appropriate depending on the application. Constant, however, is that the three parameter viscous isolator in accordance with the present invention substantially outperforms the two parameter system when isolation at frequencies substantially above resonance is important to the isolated system and/or when amplification at resonance is important.

Figure 9:
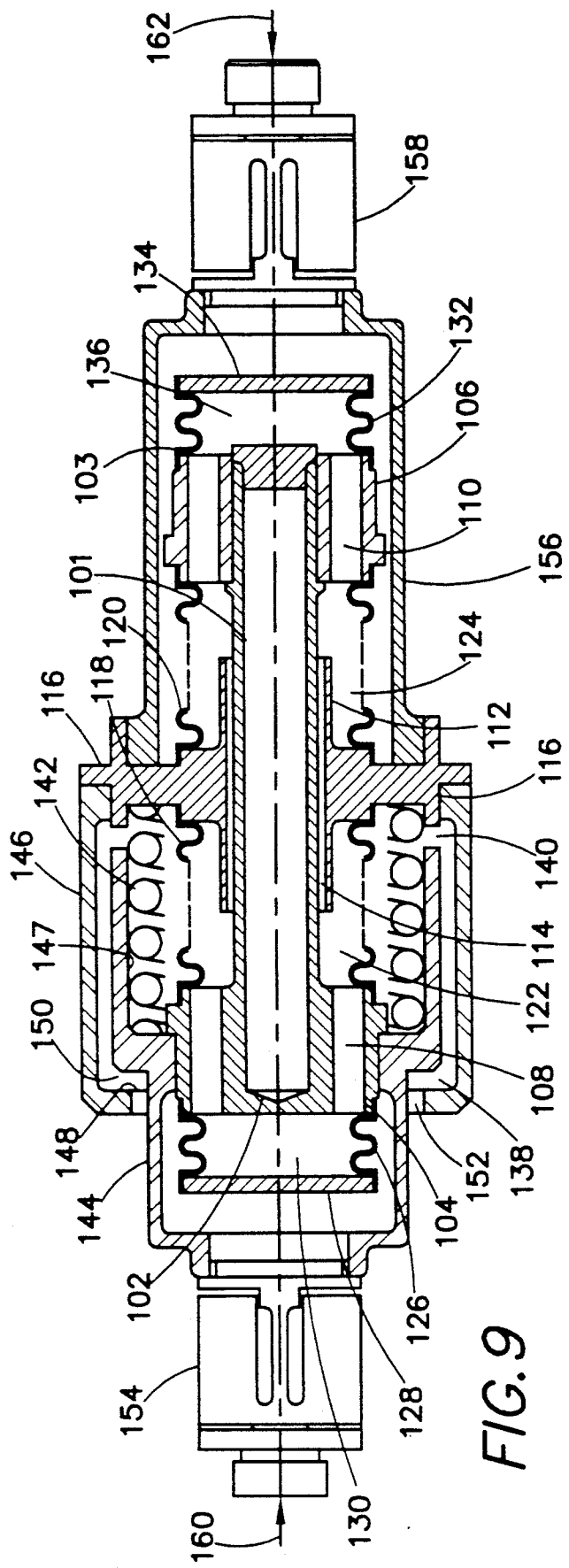
FIG. 9 is a cross-sectional view of an alternative embodiment of a viscous isolator in accordance with the present invention.

An alternative embodiment of the present invention is shown by the viscous isolator 100 of FIG. 9. Viscous isolator 100 provides the essential functions of the three parameter system in much the same manner as viscous isolator 14 in that viscous isolator 100 includes shaft 101 having first and second shaft ends 102 and 103. A first and second extension 104, 106 are coupled to and extend radially from the first and second ends 102, 103 of shaft 101, respectively. A piston 112 having an axial bore of a diameter slightly larger than the diameter of the shaft 101 is positioned coaxial to the shaft 101. The piston 112 includes a flange 116 which extends radially from the mid-section of piston 112. A first and second primary bellows 118, 120 form first and second primary fluid chambers 122,124, respectively, and first and second secondary bellows 126,132 in conjunction with first and second sealing plates 128, 134 are coupled to first and second extensions 104, 106, respectively, to form first and second secondary fluid chambers 130, 136. The first and second extensions 104, 106 include first and second secondary fluid paths 108, 110 therethrough, respectively. As such, the elements of viscous isolator 100 substantially match those of viscous isolator 14 and provide the essential three parameter functions like that of viscous isolator 14.

Viscous isolator 100 further includes a housing 156 which is connected to flange 116 for connecting force 162 via pivot flexture 158 to the viscous isolator 100. Likewise, the viscous isolator 100 includes an inner cover 144 connected to extension 104 for coupling a force 160 to the viscous isolator 100 via pivot flexture 154. A compressed gravity off load spring 143 is positioned between an inside surface 147 of inner cover 144 and flange 116 to add axial stiffness to the viscous isolator 100 to off load a load in a gravity environment; in the preferred embodiment the spring 143 can absorb about 150 pounds. An outer cover 146 connected to flange 116, provides a tension stop and gap 138 which is closed when no load is applied. In other words, surface 150 of inner cover 144 is in contact with surface 148 of outer cover 146 when no load is applied. In turn, compression stop and gap 140 would be double the size. The tension stop and gap 138 and compression stop and gap 140 are about equal when a desired and predetermined load is applied and no vibration exists. The compression stop and gap 140 protects the viscous isolator 100 against overload. Movement gap 152 allows inner cover 144 to move with respect to outer cover 146.

Those skilled in the art can recognize that only preferred embodiments of the present invention have been disclosed herein. Other advantages may be found and realized and various modifications may be suggested by those versed in the art, and it should be understood that the embodiment shown herein may be altered and modified without departing from the true spirit and scope of the invention as defined in the accompanying claims.

What is claimed is:

1. A vibration damping and isolation apparatus, comprising:
    a shaft having an axis therethrough, said shaft having a first and second end;
    a piston having an axial bore coaxially positioned with said shaft to provide a damper by forming a damping path therebetween, said piston having a flange extending radially therefrom for coupling the apparatus to a load;
    a first extension coupled to and extending radially from said first end of said shaft;
    a second extension coupled to and extending radially from said second end of said shaft;
    secondary isolation means coaxially extending from said first and second extensions for providing a first volumetric stiffness in series with said damper; and
    primary isolation means connecting said flange to said first extension and said second extension and coaxial with said shaft for providing a second volumetric stiffness in parallel with said damper and said secondary isolation means, said secondary isolation means connected to said primary isolation means via fluid paths through said first and second extensions.

2. An apparatus according to claim 1, wherein said first volumetric stiffness is less than about fifty times said second volumetric stiffness.

3. An apparatus according to claim 1, wherein said first volumetric stiffness is at least equal to about said second volumetric stiffness but no greater than about ten times said second volumetric stiffness.

4. An apparatus according to claim 1, wherein said primary isolation means includes:
   first primary bellows connected between said first extension and said flange for forming a first fluid chamber; and
   second primary bellows connected between said second extension and said flange for forming a second fluid chamber, said first fluid chamber connected to said second fluid chamber by said damping path.

5. An apparatus according to claim 4, wherein said secondary isolation means includes:
   first secondary bellows connected to said first extension and a first sealing member to form a third fluid chamber, said third fluid chamber connected to said first fluid chamber by a first fluid path through said first extension; and
   second secondary bellows connected to said second extension and a second sealing member to form a fourth fluid chamber, said fourth fluid chamber connected to said second fluid chamber by a second fluid path through said second extension.

6. An apparatus according to claim 5, wherein said damping path has a greater resistance to flow than said first and second fluid paths.

7. An apparatus according to claim 1, wherein said secondary isolation means includes:
   first secondary bellows connected to said first extension and a first sealing member to form a first secondary fluid chamber, said first secondary fluid chamber connected to said primary isolation means by a first fluid path through said first extension; and
   second secondary bellows connected to said second extension and a second sealing member to form a second secondary fluid chamber, said second secondary fluid chamber connected to said primary isolation means by a second fluid path through said second extension.

8. An apparatus according to claim 7, wherein said first and second secondary bellows include a predetermined wall thickness to tune the apparatus for optimum performance.

9. An apparatus according to claim 8, wherein said first and second secondary bellows include a predetermined number of convolutions to tune the apparatus for optimum performance.

10. An apparatus according to claim 9, wherein said predetermined number of convolutions and a predetermined wall thickness of said first and second secondary bellows are selected to set the frequency at which maximum damping occurs to be equal to a resonance frequency.

11. An apparatus according to claim 7, wherein said first and second secondary bellows include a predetermined number of convolutions to tune the apparatus for optimum performance.

12. An apparatus according to claim 1, further including means for protecting said apparatus against overload.

13. An apparatus according to claim 12, wherein said protection means includes a preloaded spring coupled to said extensions and said flange for preloading said apparatus.

14. An apparatus according to claim 1, wherein a distance between said axial bore of said piston and said shaft is continually maintained by said primary isolation means.

15. A vibration damping and isolation apparatus, comprising:
   a shaft having an axis therethrough, said shaft having a first and second end;
   a first extension extending radially from said first end of said shaft, said first extension having a first fluid path therethrough;
   a second extension extending radially from said second end of said shaft, said second extension having a second fluid path therethrough;
   a piston having an axial bore coaxially positioned with said shaft to form a damping path therebetween, said piston having a flange extending radially therefrom for coupling the apparatus to a load;
   first primary bellows connected between said first extension and said flange for forming a first fluid chamber;
   second primary bellows connected between said second extension and said flange for forming a second fluid chamber, said first fluid chamber connected to said second fluid chamber by said damping path;
   first secondary bellows connected to said first extension and a first sealing member to form a third fluid chamber, said third fluid chamber connected to said first fluid chamber by said first fluid path; and
   second secondary bellows connected to said second extension and a second sealing member to form a fourth fluid chamber, said fourth fluid chamber connected to said second fluid chamber by said second fluid path.

16. An apparatus according to claim 15,
   wherein said first and second fluid paths and said first and second secondary bellows provide a first volumetric stiffness in series with a damper provided by said damping path,
   wherein said first and second primary bellows provides a second volumetric stiffness parallel to said damper and said first volumetric stiffness, and
   wherein said first volumetric stiffness is less than about fifty times said second volumetric stiffness.

17. An apparatus according to claim 15,
   wherein said first and second fluid paths and said first and second secondary bellows provide a first volumetric stiffness in series with a damper provided by said damping path,
   wherein said first and second primary bellows provides a second volumetric stiffness in parallel to said damper and said first volumetric stiffness, and
   wherein said first volumetric stiffness is at least equal to about said second volumetric stiffness but no greater than about ten times said second volumetric stiffness.

18. An apparatus according to claim 15, wherein said first and second fluid paths have a resistance to flow which is less than said damping path.

19. An apparatus according to claim 15, further including an overload protection device including a preloaded spring coupled between said first extension and said flange for preloading said apparatus.

20. An apparatus according to claim 15, wherein said first and second secondary bellows include a predetermined wall thickness to tune the apparatus for optimum performance.

21. An apparatus according to claim 20, wherein said first and second secondary bellows include a predetermined number of convolutions to tune the apparatus for optimum performance.

22. An apparatus according to claim 15, wherein said first and secondary bellows include a predetermined number of convolutions to tune the apparatus for optimum performance.

23. An apparatus according to claim 21, wherein said predetermined number of convolutions and said predetermined wall thickness of said first and second secondary bellows are selected to set the frequency at which maximum damping occurs to be equal to a resonance frequency.

* * * * *